S. KNAPP.
CHART FOR TEACHING THE READING OF DRAWINGS.
APPLICATION FILED NOV. 24, 1911.

1,049,241.

Patented Dec. 31, 1912.

WITNESSES:

INVENTOR.

BY

ATTORNEY.

UNITED STATES PATENT OFFICE.

STEFAN KNAPP, OF DETROIT, MICHIGAN.

CHART FOR TEACHING THE READING OF DRAWINGS.

1,049,241.  Specification of Letters Patent.  Patented Dec. 31, 1912.

Application filed November 24, 1911. Serial No. 662,153.

*To all whom it may concern:*

Be it known that I, STEFAN KNAPP, a citizen of the United States, residing at Detroit, county of Wayne, State of Michigan, have invented a certain new and useful Improvement in Charts for Teaching the Reading of Drawings, and declare the following to be a full, clear, and exact description of the same, such as will enable others skilled in the art to which it pertains to make and use the same, reference being had to the accompanying drawings, which form a part of this specification.

This invention relates to charts for teaching the reading of drawings and an object of the invention is a device by means of which the relation between the several views of an article or device shown by a drawing may be graphically illustrated.

In making a working drawing, such as are made for use in the manufacture of an article, it is customary to show three or more views thereof, viz; a plan view and a view of at least two sides in elevation. The general practice is to make the side views in what is termed "quarter projection", by which is meant that, in looking at the plan view, that side is shown which would be uppermost if the device or article were rotated toward the observer through an arc of ninety degrees, or one-fourth of a complete revolution from the position as shown by the plan.

To those unskilled in the use of a drawing or deficient in the knowledge of the requirements thereof, it is a difficult matter to comprehend the relation between the representations of the various surfaces of an article or device and it is to impart a knowledge of such relation that the chart herein shown was principally devised.

The manner in which the chart is to be used and the general construction thereof are hereinafter more fully described and claimed and shown in the accompanying drawings in which—

Figure 1:
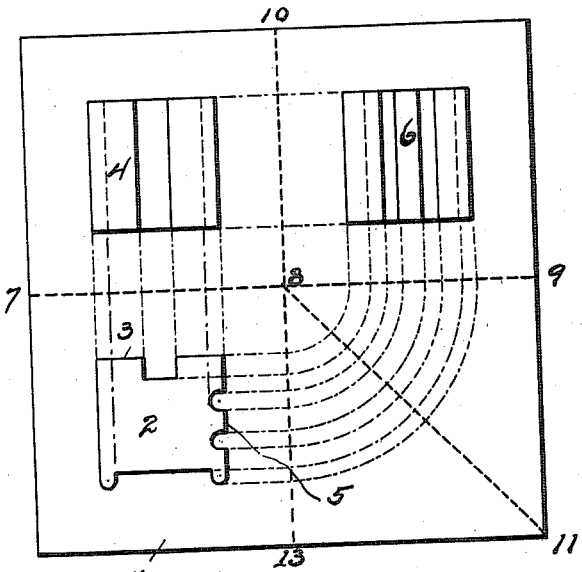
Figure 2:
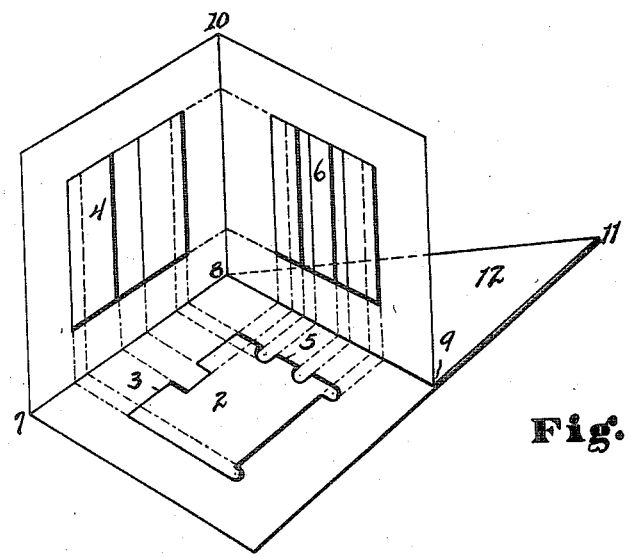

Figure 1 is a plan view of a chart embodying my invention. Fig. 2 is a perspective view of the chart showing the method of folding whereby the various elevations thereon are brought into an upright position opposite that side of the plan of which they are a projection.

Similar characters refer to similar parts throughout the drawing and specification.

1 indicates the body of the chart, preferably rectangular in outline, which may be formed of any desirable material, preferably paper of such weight and texture as to withstand considerable handling and folding, to which end it may be mounted on cloth.

On the sheet may be shown by plan and elevation any desired device or article as, for instance, the peculiarly shaped block of metal shown by the plan 2. The side 3 of the block is shown at 4 and the side 5 is shown at 6, and the dotted lines connecting the three figures indicate which side of the plan is shown in elevation.

The dotted lines 7—8, 8—9, 8—10, and 8—11 indicate the lines on which the chart is to be folded in order that the various views may be brought into an upright relation with the plan view as shown in Fig. 2. The fold on the line 8—9 is the reverse of the fold on line 7—8 as may be seen in Fig. 2 and the chart may be cut on the line 8—11 to enable the fold on line 8—9 to be readily made. As a further aid in the folding of the sheet, the chart may be scored on the indicated line of fold.

By folding the chart in the manner indicated and by holding it or placing it on a flat surface with the plan view in the position shown in Fig. 2, the side views 4 and 6 stand in an upright position relative to the plan view opposite that side thereof of which they are a projection and the relation between the views is thus graphically shown. In folding the chart that portion 12 thereof, which is shown as folded upon itself, provides a means by which it may be handled.

It is to be understood that the views on the chart may occupy various positions depending largely upon what side of the plan is to be shown in elevation and also that the plan view may occupy a different position on the sheet, as, for instance, the position shown as occupied by the side elevation 4 with one side elevation to the right thereof and one directly beneath it, in which case the folds would not be exactly on the lines stated but an additional fold on the line 8—13 would necessarily be made to allow the two side views to be brought to an upright position. It is also to be understood that views other than in "quarter projection" may be shown on the chart and that all such alterations in the positions of the figures and in the manner of folding may be made without departing from the spirit of this invention.

What I claim and desire to secure by Letters Patent of the United States is—

1. A chart for the purpose described consisting of a foldable sheet of suitable material having a drawing thereon representative of an article or device in plan and elevation, and means indicating the lines on which the sheet is to be folded; the lines of fold being such that the said elevation or elevations may be brought to an upright position relative to the plan view.

2. A chart for the purpose described consisting of a foldable sheet of suitable material having a drawing thereon representative of an article or device in plan and elevation, and means indicating the lines on which the sheet is to be folded; the lines of fold being such that the said elevation or elevations may be brought to an upright position relative to the plan view and opposite that side of the plan view of which it or they are a projection.

3. A chart for the purpose described consisting of a foldable sheet of suitable material having a drawing thereon representative of an article or device in plan and elevation, and means indicating the lines on which the sheet is to be folded; the lines of fold being such that the elevation or elevations may be brought to an upright position relative to the plan view and a portion of the sheet so folded as to form a hand-hold.

In testimony whereof, I sign this specification in the presence of two witnesses.

STEFAN KNAPP.

Witnesses:
 CLIFFORD CLARK,
 CHARLES E. WISNER.